United States Patent
Gibbs et al.

(10) Patent No.: US 10,010,047 B2
(45) Date of Patent: Jul. 3, 2018

(54) MILKING PROCESS MONITORING

(71) Applicant: TAG IT TECHNOLOGIES LIMITED, Hamilton (NZ)

(72) Inventors: Russell Norman Gibbs, Tamahere (NZ); Trent Allan Finlay, Hamilton (NZ)

(73) Assignee: TAG IT TECHNOLOGIES LIMITED, Hamilton (NZ)

( * ) Notice: Subject to any disclaimer, the term of this patent is extended or adjusted under 35 U.S.C. 154(b) by 0 days.

(21) Appl. No.: 14/658,516

(22) Filed: Mar. 16, 2015

(65) Prior Publication Data

US 2015/0181828 A1 Jul. 2, 2015

Related U.S. Application Data

(63) Continuation of application No. 13/302,363, filed on Nov. 22, 2011.

(51) Int. Cl.
| | |
|---|---|
| *A01J 5/007* | (2006.01) |
| *A01J 5/00* | (2006.01) |
| *A01J 7/00* | (2006.01) |

(52) U.S. Cl.
CPC ............ *A01J 5/007* (2013.01); *A01J 5/00* (2013.01); *A01J 7/00* (2013.01)

(58) Field of Classification Search
CPC ..... A01J 5/007; A01J 7/04; A01J 5/01; A01K 5/02; A01K 29/005
USPC ................ 119/14.02, 14.08, 14.14
See application file for complete search history.

(56) References Cited

U.S. PATENT DOCUMENTS

| | | | |
|---|---|---|---|
| 4,616,215 | A | 10/1986 | Maddalena |
| 6,742,474 | B2 | 6/2004 | van den Berg et al. |
| 7,954,453 | B2 | 6/2011 | Mein |
| 8,191,506 | B2 | 6/2012 | Caldenius |
| 8,528,500 | B2 | 9/2013 | Torgerson et al. |
| 2009/0145363 | A1 | 6/2009 | Caldenius |
| 2009/0288605 | A1 | 11/2009 | De Villiers |

(Continued)

FOREIGN PATENT DOCUMENTS

| | | |
|---|---|---|
| CH | 646254 | 11/2011 |
| NZ | 272754 | 3/1997 |

(Continued)

OTHER PUBLICATIONS

Boswell "Milking monitor keeps close watch in shed," The Dairyman, Dec. 2011, p. 58.

(Continued)

*Primary Examiner* — Son T Nguyen
(74) *Attorney, Agent, or Firm* — Greer, Burns & Crain, Ltd.

(57) ABSTRACT

A method that can monitor a milking process is presented and, in particular, a method and apparatus that can effectively determine the stage of the milking process. An additional aspect is to provide a method that may measure a vacuum level associated with the milking process, receive an operational state of a valve associated with the milking process, and compare the vacuum level and valve operational state to criteria to determine the milking stage. Further, the method may be configured to issue an indication of the milking stage or issue an alarm if alarm conditions are satisfied.

15 Claims, 2 Drawing Sheets

(56) References Cited

U.S. PATENT DOCUMENTS

| | | |
|---|---|---|
| 2010/0018465 A1* | 1/2010 | Idensjo .................. A01J 5/047 119/14.08 |
| 2010/0170445 A1 | 7/2010 | Gerrit |
| 2011/0247564 A1 | 10/2011 | Schrader et al. |
| 2012/0097107 A1 | 4/2012 | Torgerson et al. |
| 2013/0019806 A1 | 1/2013 | de Groot |
| 2013/0319336 A1 | 12/2013 | Thompson |

FOREIGN PATENT DOCUMENTS

| | | |
|---|---|---|
| NZ | 507954 | 11/2002 |
| NZ | 518049 | 11/2003 |
| NZ | 547497 | 10/2007 |
| WO | 1984004228 | 11/1984 |
| WO | 2002052927 | 7/2002 |
| WO | 2008051135 | 5/2008 |

OTHER PUBLICATIONS

"MS2 Data Hub brochure," TagIt, Oct. 2010, 2 pages.
"MS2 Milk Monitoring System," TagIt, Apr. 2011, 2 pages.
"Your milk's guardian angel ad," TagIt, Sep. 2011, 1 page.
Halo Brochure, TagIt, Nov. 2011, 4 pages.
"In the Beginning There Was Milk," TagIt, Nov. 2011, 1 page.

* cited by examiner

MILKING PROCESS MONITORING

PRIORITY CLAIM

This application is a continuation of and claims priority to U.S. patent application Ser. No. 13/302,363 filed on Nov. 22, 2011, the entire contents of which is incorporated herein by reference.

TECHNICAL FIELD

The present invention relates to a method of monitoring a milking process. More particularly, the present invention relates to a system and method for determining the stage of a milking process.

BACKGROUND

Demands for greater efficiency, higher product quality, and improved quality of life on the part of farmers are driving the development of milking technology towards automated farming solutions.

A wide range of sensors have been developed for monitoring the various aspects of milking shed operation—from milk temperature, to milk flow rate, to milk volume in the vat. The data gathered from these sensors may be used to monitor the operation of a milking plant and ensure that the operation and processing meets established criteria.

Where criteria are not met, alarms may issue bringing the problem to a farmer's attention.

One of the issues faced in accurately determining whether alarm conditions are occurring lies in knowing the current stage of the milking process e.g. milking, washing or dormant. Without this information there is no context for the measurements obtained by the various sensors, and automated alarms may only be issued for a limited number of rudimentary conditions which exist at all stages of the milking.

A farmer involved in milking is typically occupied with stock management and various other tasks, and it is neither desirable nor reliable for the farmer to manually enter the current stage of the process into a user interface.

Some systems exist which integrate all components of a milking plant, including a manual controller which dictates when the milking process switches between stages of the milking process. Such systems only know the stage of milking through manual intervention and may adjust their alarms accordingly.

However, such systems typically can require replacement of particular components of a milking plant in order to function—and are rarely compatible with components manufactured by other parties.

Upgrading or replacing components of a milking plant in order to achieve this functionality may not be financially viable to some farmers. At the very least, it may restrict their options.

It would be advantageous to provide a way of determining the stage of the milking process which may be readily integrated with existing infrastructure.

It is an object of the present invention to address the foregoing problems or at least to provide the public with a useful choice.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art.

Throughout this specification, the word "comprise", or variations thereof such as "comprises" or "comprising", will be understood to imply the inclusion of a stated element, integer or step, or group of elements integers or steps, but not the exclusion of any other element, integer or step, or group of elements, integers or steps.

Further aspects and advantages of the present invention will become apparent from the ensuing description which is given by way of example only.

SUMMARY

According to one aspect of the present invention there is provided method of determining a current stage of a milking process having a plurality of stages, the method comprising the steps of:

measuring a vacuum level associated with the milking process; and receiving an operational state of at least one valve associated with the milking process; and determining the current stage by comparing the vacuum level and operational state of the valve with predetermined criteria associated with the plurality of stages using a processor; and issuing an indication of the current stage of the milking process.

According to another aspect of the present invention there is provided an apparatus for determining a current stage of a milking process having a plurality of stages, the apparatus including:

a vacuum level sensor configured to output a signal indicating a measured vacuum level;

a valve configured to output a signal indicating an operational state of the valve; and a processor configured to:

receive the signals indicating vacuum level and valve state;

determine the current stage by comparison of the vacuum level and operational state of the valve with predetermined criteria associated with the plurality of stages; and issue an indication of the current stage of the milking process.

Reference to a stage of the milking process should be understood to mean any period in which activity of a milking plant is characterised by a particular activity.

For example, the milking process may include the stages of:

an off-line stage, during which a milking plant is not operational and a milk storage vat is substantially empty;

a milking stage, during which milk is extracted and transported to the storage vat;

a washing stage, during which the milking system is exposed to at least one cleaning agent;

an off-site stage, during which the milking plant is not operational and the storage vat contains milk; and a deactivation stage, during which the milking plant can be run for maintenance purposes and no alarm conditions are presented.

It is envisaged that in milking plants having more than one vat for storing extracted milk, the milking stage may be identified by which vat the milk is directed to.

Reference to a vacuum level sensor should be understood to means any sensor by which pressure or vacuum may be detected. It should be appreciated that the measurement provided by the vacuum level sensor may be an indication that a vacuum is present, or a magnitude of the vacuum level.

Alternatively the measurement may relate to the frequency of the vacuum (whether due to pulsation or otherwise), patterns within the magnitude or frequency of the vacuum, or transition points between levels of vacuum. It should be appreciated that these factors are given by way of example, and are not intended to be limiting.

In a preferred embodiment, the apparatus comprises at least one additional sensor configured to communicate with the processor.

Preferably the apparatus comprises a cleaning agent sensor configured to output a signal indicating a measured characteristic of a cleaning agent.

Reference to a cleaning agent should be understood to mean any medium by which the lines/traps/filters and various other components of a milk transport system may be cleaned.

Preferably the cleaning agent is water. However, this is not intended to be limiting, as the cleaning agent may be air, detergent, acid or any combination thereof.

Similarly to the vacuum level sensor discussed above, the sensor(s) may measure and output an indication as to the presence of the cleaning agent, or any number of other associated characteristics such as turbidity, magnitude, flow rate, salinity, conductivity and so on.

It is envisaged that the at least one valve will be an inlet valve into a vat. The operational states of such a valve may be open or closed. It should be appreciated that this is not intended to be limiting, and it is envisaged that outlet valves on a vat, or valves controlling discharge of milk to waste may also be implemented in the present invention.

The predetermined criteria associated with the plurality of stages may be stored in memory associated with or accessible by the processor.

As an example of a comparison with predetermined criteria: on receiving information that vacuum is detected, an inlet valve on a vat is open, and an outlet valve on the vat is closed, the processor may compare these factors with a look up table and determine that these correlate to the milking process being in the milking stage. The processor may then issue an indication confirming this.

An indication as to the current stage of milking may be a visual or audible indication, a software flag, a signal transmitted to another component of the milking plant-virtually any suitable means by which the current stage of milking may be electronically communicated (whether digital or analog).

In a preferred embodiment, additional measurements relating to other factors in the milking process are made and transmitted to the processor.

For example, it is envisaged that milk and cleaning agent temperature may be measured by temperature sensors, and vat milk level measured.

It should be appreciated that these examples are not intended to be limiting, and that virtually any aspect of the milking process may be monitored in accordance with this aspect of the present invention. Factors such as the operational state of valves may also be monitored.

Additionally, timers may be used in conjunction with these measurements in order to determine the length of time over which the measured conditions occur.

In a preferred embodiment the processor is configured to receive at least one signal from the additional sensor indicating measurement of another factor, compare the measurement of the other factor to at least one alarm condition, and issue an alarm if the alarm conditions are met.

An example of an alarm condition may be the temperature of milk stored in a vat dropping below a particular temperature, or where the vat stirring mechanism is not operational.

In a preferred embodiment the additional sensor is a temperature sensor configured to measure wash water temperature, and the alarm condition is a predetermined temperature threshold. Some cleaning detergents require a minimum temperature level to be achieved before components of the detergent are activated or optimized.

This alarm may be in the form of a visual or audio alert in the milking plant itself, a message to a hand-held device such as a mobile phone, an email, and/or an alert in associated farm management software to bring the alarm to the farmer's attention at a later time.

It should be appreciated that all data may be transmitted to, and stored or processed at a remote location relative to the milking plant. For example, it is envisaged that the processor may be an external server. Data transmission may be achieved by any suitable means known in the art.

It is anticipated by the inventors that the precise conditions may vary depending on a number of factors such as preferred practice of the farm operator, infrastructure and hardware associated with the milking process, and location. Therefore, it is envisaged that the processor may be configured to receive configuration commands regarding the alarm conditions and/or activation of the alarm(s).

These configuration commands may adjust the thresholds and time limits associated with the alarm conditions. Further, the commands may adjust preferences associated with the user interface of the system—such as the volume or length of activation of a siren/strobe unit, or the addresses to which electronic messages should be sent.

For a firmware and/or software (also known as a computer program) implementation, the techniques of the present invention may be implemented as instructions (for example, procedures, functions, and so on) that perform the functions described. The firmware and/or software codes may be stored in a memory and executed by the processor or additional processors. The software may be stored in memory implemented within the processor or external to the processor.

The steps of a method, process, or algorithm described in connection with the present invention may be embodied directly in hardware, in a software module executed by the processor, or in a combination of the two. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the processes.

The processor may include one or more application specific integrated circuits (ASICs), digital signal processors (DSPs), digital signal processing devices (DSPDs), programmable logic devices or controllers (PLDs, PLCs), field programmable gate arrays (FPGAs), computers, lap tops, controllers, micro-controllers, microprocessors, electronic devices, other electronic units (whether analogue or digital) designed to perform the functions described herein, or a combination thereof.

BRIEF DESCRIPTION OF THE DRAWINGS

Further aspects of the present invention will become apparent from the ensuing description which is given by way of example only and with reference to the accompanying drawings in which.

DETAILED DESCRIPTION

Figure 1:
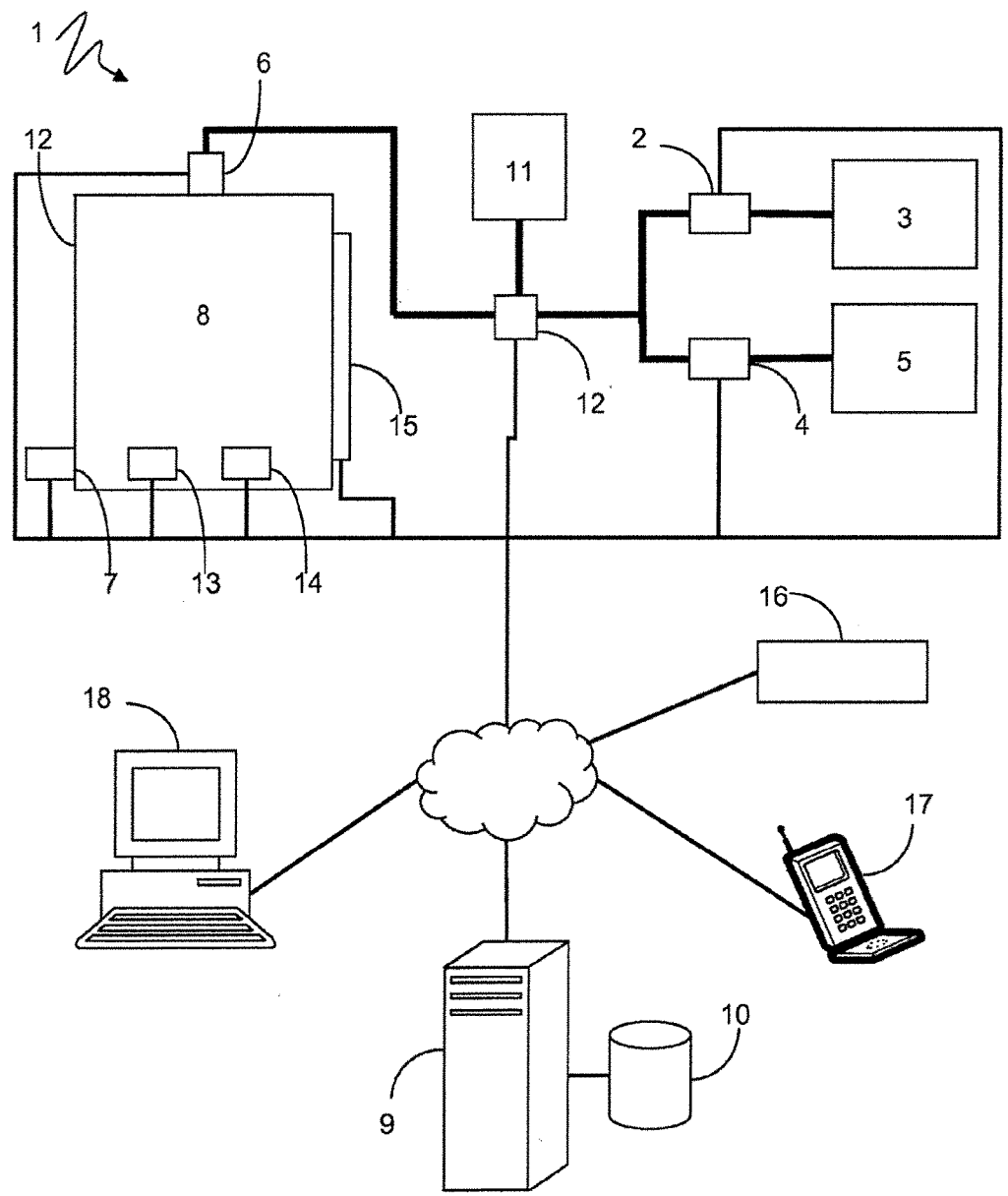
FIG. 1 illustrates a schematic diagram of an apparatus in accordance with an embodiment of the present invention.

FIG. 1 illustrates an apparatus for determining a current stage of a milking process having a plurality of stages (generally indicated by arrow 1).

The apparatus (1) includes a vacuum level sensor (2), configured to output a signal indicating a measured vacuum level. The vacuum is generated by a vacuum pump (3).

The apparatus (1) also includes a cleaning agent flow rate sensor (4), configured to output a signal indicating a measured cleaning agent flow rate. Cleaning agent is released from a cleaning agent system (5).

The apparatus (1) also includes an inlet valve (6), and an outlet valve (7), each connected to a milk storage vat (8) and configured to output a signal indicating the respective valve's operational state.

The apparatus (1) also includes a processor (9) configured to receive the signals indicating vacuum level, cleaning agent flow rate and valve state.

The processor (9) is configured to determine the current stage of the milking process by comparison of the vacuum level, flow rate and valve state with predetermined criteria associated with the plurality of stages stored in memory (10), and issue an indication of the current stage of the milking process.

The milking process includes the stages of:
an off-line stage, during which the apparatus (1) is not operational;
a milking stage, during which milk is extracted by at least one milking station (11) and transported to the vat (8);
a washing stage, during which a cleaning agent is released by the cleaning agent system (5);
an off-site stage, during which the apparatus (1) is not operational and the vat (8) contains more than a particular level of milk; and
a deactivation stage, during which the apparatus (1) can be run for maintenance purposes and no alarm conditions are presented.

Further details with regard to determination of the current stage are discussed with reference to FIG. 2. The apparatus (1) also includes additional sensors or components connected to the processor (9). These include a line temperature sensor (12), a vat temperature sensor (13), vat stirrer (14), and vat level sensor (15).

Figure 2:
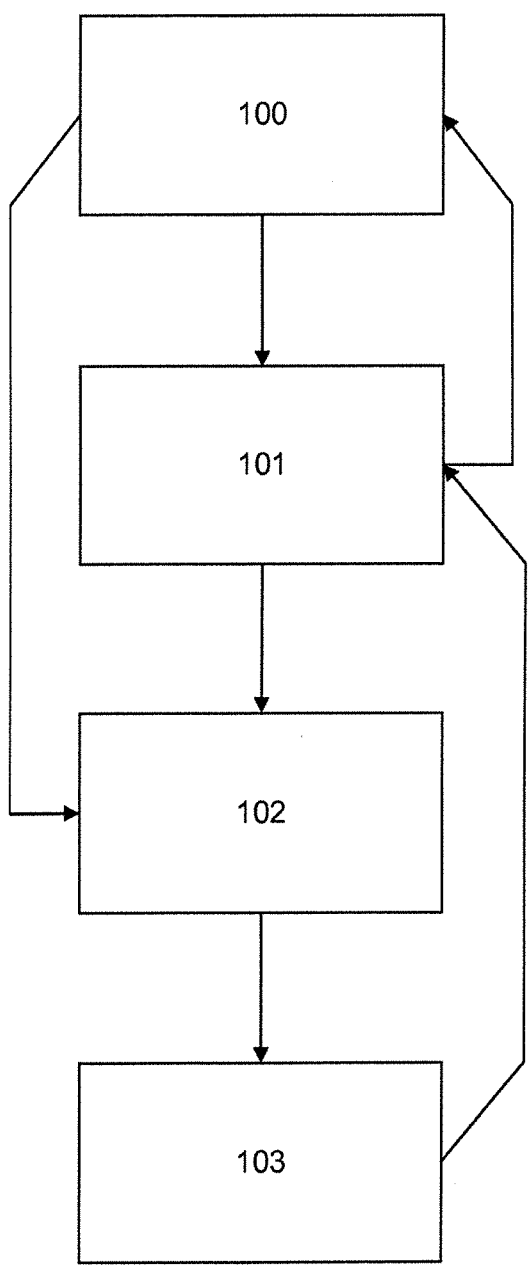
FIG. 2 is a flow diagram illustrating a method in accordance with an embodiment of the present invention.

The processor (9) is configured to compare measurements provided by these sensors in order to determine whether an alarm condition has been met (discussed further with reference to FIG. 2).

The alarm may be issued via a siren/strobe unit (16), a message to a mobile device (17), or an email and/or an alert in associated software on a personal computer (18).

FIG. 2 illustrates the stages of the milking process, and how the current stage is determined, together with the alarm conditions associated with each stage. It should be appreciated that the specific thresholds discussed are illustrative and not intended to be limiting. Specific conditions will likely vary between Integers of FIG. 1 may be referred in the course of describing the process.

Stage 100 is the off-line stage.

Where vacuum is detected, the inlet valve (6) is open, and the outlet valve (7) is closed, the current stage is determined to be the milking stage (101).

At this time, a timer (not illustrated) is started.

The alarm conditions associated with the milking stage (101) include:
vat inlet valve (6) closed;
vat outlet valve (7) opened;
milk level as measured by vat milk level sensor (15) is high;
milk temperature as measured by line temperature sensor (12) is high after 10 minutes;
vat stirrer (14) is not operating after 45 minutes; and
milk temperature as measured by vat temperature sensor (13) is high.

If loss of vacuum is detected while in the milking stage (101), the current stage is determined to be the off-line stage (100).

From the off-line stage (100), if vacuum is detected and cleaning agent flow detected the current stage is determined to be the washing stage (102).

Alternatively, from the milking stage (101) if cleaning agent flow is detected the current stage is determined to be the washing stage (102).

At this time, the timer is started.

The alarm conditions associated with the washing stage (102) include:
vat inlet valve (6) open; and
wash water temperature as measured by line temperature sensor (12) does not reach desired temperature (e.g. 55 .degree. C.). It should be appreciated that the desired temperature will be determined by the composition of the cleaning detergents added to the water, and the temperature required for optimal performance of the detergent.

From the washing stage (102), if a loss of vacuum is detected, the current stage is determined to be the off-site stage (103).

Alarm conditions associated with the off-site stage (103) include:
milk temperature as measured by vat temperature sensor (13) is high after 180 minutes from entry into the washing stage (102).

From the off-site stage (103), if vacuum is detected together with the inlet valve (6) being open and the outlet valve (7) closed, the current stage will be determined to be the milking stage (101).

Aspects of the present invention have been described by way of example only and it should be appreciated that modifications and additions may be made thereto without departing from the scope thereof as defined in the appended claims.

The invention claimed is:

1. A method of determining a current stage of a milking process in a milking system comprising a milking plant and a milk storage vat, the method comprising the steps of:
receiving, at a processor, a vacuum signal indicative of a measured vacuum level associated with the milking process; and
receiving, at the processor, a valve state signal indicative of an operational state of at least one valve associated with the milking process; and
determining, using the processor, whether the current stage of the milking process is one of a plurality of stages comprising at least: an off-line stage during which the milking plant is not operational and the milk storage vat is substantially empty, a milking stage during which milk is extracted by the milking plant and transported to the storage vat, and an off-site stage during which the milking plant is not operational and the storage vat contains milk, wherein determining the current stage comprises comparing both the vacuum level and the operational state of the valve with predetermined criteria associated with the plurality of stages; and issuing an indication of the current stage of the milking process.

2. The method of claim 1, wherein the plurality of stages comprise a washing stage.

3. The method of claim 1, further comprising the steps of:
measuring at least one other factor in the milking process;
transmitting this factor to the processor;
comparing the measurement of the other factor to alarm conditions; and
issuing an alarm if the alarm conditions are met.

4. The method of claim 3, wherein the other factor is cleaning agent flow rate.

5. The method of claim 3, wherein the other factor is wash water temperature, and the alarm condition is a predetermined temperature threshold.

6. The method of claim 1, wherein receiving the valve state signal comprises receiving an inlet valve signal from an inlet valve to the milk storage vat, and an outlet valve signal from an outlet valve from the milk storage vat, wherein determining that the current stage is the milking stage comprises determining that (i) the vacuum level is indicative of vacuum being present, (ii) the operational state of the inlet valve indicates that the inlet valve is open, and (iii) the operational state of the outlet valve indicates that the outlet valve is closed.

7. An apparatus for determining a current stage of a milking process in a milking system comprising a milking plant and a milk storage vat, the apparatus including:
a vacuum level sensor configured to output a vacuum signal indicating a measured vacuum level associated with the milking process;
a valve configured to output a valve state signal indicating an operational state of the valve; and
a processor configured to:
receive the signals indicating vacuum level and valve state;
determine whether the current stage of the milking process is one of a plurality of stages comprising at least: an off-line stage during which the milking plant is not operational and the milk storage vat is substantially empty, a milking stage during which milk is extracted by the milking plant and transported to the storage vat, and an off-site stage during which the milking plant is not operational and the storage vat contains milk, wherein determination of the current stage comprises comparison of both the vacuum level and the operational state of the valve with predetermined criteria associated with the plurality of stages; and issue an indication of the current stage of the milking process.

8. The apparatus of claim 7, wherein the apparatus comprises at least one additional sensor configured to communicate with the processor.

9. The apparatus of claim 8, wherein the processor is configured to:
receive at least one signal from the additional sensor indicating measurement of another factor;
compare the measurement of the other factor to at least one alarm condition; and
issue an alarm if the alarm conditions are met.

10. The apparatus of claim 9, wherein the additional sensor is a cleaning agent sensor configured to output a signal indicating a cleaning agent flow rate.

11. The apparatus of claim 9, wherein the additional sensor is a temperature sensor configured to measure wash water temperature, and the alarm condition is a predetermined temperature threshold.

12. The apparatus of claim 9, wherein the alarm is a siren or light.

13. The apparatus of claim 9, wherein the alarm is an electronic message to a computer.

14. The apparatus of claim 9, wherein the alarm is an electronic message to a hand-held device.

15. The apparatus of claim 7, wherein the valve comprises an inlet valve to the milk storage vat, and the apparatus further comprises an outlet valve from the milk storage vat configured to output an outlet valve state signal indicating an operational state of the outlet valve, wherein the processor is configured to determine that the current stage is the milking stage when the vacuum level is indicative of vacuum being present, the operational state of the inlet valve indicates that the inlet valve is open, and the operational state of the outlet valve indicates that the outlet valve is closed.

* * * * *